United States Patent
Uecker

(10) Patent No.: US 7,747,689 B2
(45) Date of Patent: Jun. 29, 2010

(54) METHOD FOR TRANSMITTING MESSAGES IN A NETWORK

(75) Inventor: Rainer Uecker, Mülheim (DE)

(73) Assignee: Siemens Aktiengesellschaft, Munich (DE)

( * ) Notice: Subject to any disclaimer, the term of this patent is extended or adjusted under 35 U.S.C. 154(b) by 94 days.

(21) Appl. No.: 10/574,172

(22) PCT Filed: Aug. 3, 2004

(86) PCT No.: PCT/EP2004/051695

§ 371 (c)(1), (2), (4) Date: Oct. 25, 2006

(87) PCT Pub. No.: WO2005/034450

PCT Pub. Date: Apr. 14, 2005

(65) Prior Publication Data

US 2007/0041359 A1 Feb. 22, 2007

(30) Foreign Application Priority Data

Sep. 30, 2003 (DE) ................................ 103 45 542

(51) Int. Cl.
*G06F 15/16* (2006.01)
(52) U.S. Cl. .................... 709/206; 709/207; 709/218; 709/200
(58) Field of Classification Search .......... 709/206–207
See application file for complete search history.

(56) References Cited

U.S. PATENT DOCUMENTS

| | | | | |
|---|---|---|---|---|
| 4,601,586 A | * | 7/1986 | Bahr et al. | 709/206 |
| 5,790,793 A | * | 8/1998 | Higley | 709/218 |
| 5,828,836 A | * | 10/1998 | Westwick et al. | 709/200 |
| 6,018,762 A | * | 1/2000 | Brunson et al. | 709/206 |
| 6,108,688 A | * | 8/2000 | Nielsen | 709/206 |
| 6,108,689 A | * | 8/2000 | Fagen et al. | 709/206 |
| 6,112,229 A | * | 8/2000 | Hardy et al. | 709/206 |
| 6,434,601 B1 | * | 8/2002 | Rollins | 709/206 |
| 6,988,129 B2 | * | 1/2006 | Quine | 709/206 |
| 7,080,123 B2 | * | 7/2006 | Freed | 709/206 |
| 2003/0023697 A1 | * | 1/2003 | Okada | 709/206 |
| 2003/0055903 A1 | * | 3/2003 | Freed | 709/206 |

FOREIGN PATENT DOCUMENTS

| | | | |
|---|---|---|---|
| JP | 11232188 A | * | 8/1999 |
| WO | WO 01/20855 A1 | | 3/2001 |
| WO | WO 0120855 A1 | * | 3/2001 |

* cited by examiner

*Primary Examiner*—Rupal D Dharia
*Assistant Examiner*—Hua Fan

(57) ABSTRACT

The invention relates to a method for transmitting messages in a network via data terminals connected thereto. This method comprises the following steps: sending a message to be relayed from a sender data terminal to an assigned first mail processing device assigning a unique identifier to the message which indicates that a message to be relayed is in the sender data terminal or in the first mail processing device; evaluating the identifier by the first mail processing device based on data present therein concerning the entry of a message at an address data terminal from the past, and in response to the evaluation result, transmitting in a triggered or blocked manner the message or parts thereof to the address data terminal. The invention also relates to a data terminal and network that carry out the inventive method using mail processing devices.

9 Claims, 3 Drawing Sheets

METHOD FOR TRANSMITTING MESSAGES IN A NETWORK

CROSS REFERENCE TO RELATED APPLICATIONS

This application is the US National Stage of International Application No. PCT/EP2004/051695, filed Aug. 3, 2004 and claims the benefit thereof. The International Application claims the benefits of German application No. 10345542.6 DE filed Sep. 30, 2003, both of the applications are incorporated by reference herein in their entirety.

FIELD OF THE INVENTION

The invention relates to a method for transmitting messages in a network according to the claims, a data terminal according to the claims, and a network for transmitting data according to the claims.

BACKGROUND OF THE INVENTION

The transmission of electronic information by electronic means, i.e. by e-mail for instance, is becoming increasingly important in the current age of modern information technology. As well as reducing costs, for example because less paper is used or because of savings in postage and delivery costs, which may be extremely high especially where speed is of the essence, the main advantage of transmitting messages by electronic means is that a message can reach the recipient within a very short time of being sent.

A further advantage of electronic messaging becomes evident in cases where a message needs to be sent not just to one recipient, but to a number of recipients. Whilst such a message would once have needed to be painstakingly copied or passed on from one recipient to the next—a time-consuming process—it is now possible for the message to be copied to them by electronic means in a matter of seconds. For this purpose, e-mail programs usually have a facility for defining so-called message groups, for example for interest communities or work teams. A message group lists together those persons to whom a message or e-mail is to be sent or relayed. Once the message groups have been set up, sending a message to all members of the message group is a simple process in that the addressee for the message is the message group. The onward distribution to the individual members of the message group is handled automatically by the e-mail program or by a mail server connected to it. It is usual in companies, for example, for individuals to be assigned not only to one message group, but to several in connection with various tasks.

For the sender of a message, finding out which persons belong to a message group is a highly time-consuming or even impossible task. It is therefore also difficult to determine whether one recipient of the message to be transmitted has already received it as a member of a different message group. It is virtually impossible for the sender to determine whether one of the intended recipients has already received the message from another sender. This is particularly problematic in the case of messages that have been or are to be forwarded.

This often means that recipients of messages receive the same message from one or more persons. In addition, if the message is sent by different persons, the sender sometimes adds a comment to the message, whilst the attachments etc. contained in the message remain unchanged. Whilst the comments may be of interest to the recipient in this case, the remainder of the message does not contain any new information.

For example, a manager of a team and an employee in his team may receive news about changes and activities from a standardization body via an appropriate message distribution list. The manager, who has likewise listed all his employees in a message group, forwards the message from the standardization body to his employees via the group distribution list defined by him. However, because there is a multitude of message group distribution lists in existence, it is virtually impossible for the manager to tell that one of his employees has already received the information via a different route. As a result of the employee receiving the message more than once, the amount of data traffic in the network is unnecessarily increased as well as the productivity of the employee being reduced since the latter has to spend part of his working time on identifying and deleting duplicate messages that have been received. In addition, when deleting such a duplicate message, it is often not sufficient simply to delete the message without opening it since it is not usually possible to tell from the subject line whether or not the sender of the message has added a comment to it.

SUMMARY OF THE INVENTION

The object of this invention is to specify a method and a suitable device that will automatically suppress the multiple reception of messages to a large extent, whilst ensuring that parts of the message that have been amended by the sender are still transmitted.

This object is achieved by a method having the features described in the claims, by a data terminal having the features described in the claims, and by a network for transmitting data having the features described in the claims. Practical developments of the inventive concept are the object of the dependent claims.

A key concept of the invention is that a method for transmitting messages in a network via data terminals connected thereto comprises the following steps: sending a message to be relayed from a sender data terminal to an assigned first mail processing device; assigning a unique identifier to the message which indicates that a message to be relayed is on the sender data terminal or in the first mail processing device; evaluating the identifier by the first mail processing device based on data present therein concerning the entry of messages at an address data terminal from the past, and, in response to the evaluation result, triggering or blocking the transmission of the message or parts thereof to the address data terminal.

The object is also achieved by a method for transmitting messages in a network via data terminals connected thereto, comprising the following steps: sending a message to be relayed from a sender data terminal to an assigned first mail processing device; assigning a unique identifier to the message which indicates that a message to be relayed is on the sender data terminal or in the first mail processing device; relaying the identifier to a second mail processing device which is assigned to an address data terminal for the message to be forwarded; evaluating the identifier by the second mail processing device based on data present therein concerning the entry of messages at an address data terminal from the past, and, in response to the evaluation result, triggering or blocking the transmission of the message or parts thereof to the address data terminal.

This method enables data traffic to be substantially reduced. In addition, it cuts the time needed for processing messages, leading to savings in staff costs. Furthermore, the memory requirement—particularly for the recipient—is greatly reduced, and the costs of providing and maintaining the network can also be reduced since backup systems as well as any bandwidths, for example, can be scaled down as a result of the reduction in data traffic.

Depending on the method selected, it is advantageous if the data concerning the entry of messages at the address data terminal is stored in the address data terminal and/or in the first mail-processing device or at the address data terminal and/or in the first and/or the second mail-processing device. The data concerning the entry of messages in the address data terminal may thus be stored on one or more devices taking into account the prevailing parameters, such as—for example—the network architecture. A further advantage of storage in multiple locations is that it can sometimes eliminate the need to make a further backup, whether on a tape device or similar.

In a preferred embodiment the data concerning the entry of messages at the address data terminal is stored in the mail-processing device in which the identifier is evaluated. This eliminates the need for information for the evaluation process in the mail-processing device to be retrieved via the network, ensuring high evaluation speed. It is preferable for the first mail-processing device to be implemented in the sender data terminal and/or for the second mail-processing device to be implemented in the address data terminal. This embodiment is characterized in that no additional hardware needs to be provided in the network for the inventive method.

In a preferred embodiment, the identifier is evaluated on a mail server in the network. In this case, too, it is not necessary to acquire new hardware for the network. In a further preferred embodiment, the identifier is composed of subidentifiers, each of which are assigned message elements, for example a header and/or one or more attachments, with each subidentifier being evaluated in the respective mail processing device based on the data present therein concerning the entry of messages at the address data terminal from the past, and with transmission of the respective message element being triggered or blocked in response to the evaluation result.

This embodiment is characterized in that the method based on the allocation of subidentifiers to message elements is particularly simple to execute. Since messages very often consist of individual message elements, for example a header and one or more attachments, selecting which message elements are to be transmitted and which are not is a simple process.

If the transmission is blocked on the basis of the evaluation result, a notification of the blocked transmission is preferably forwarded to the sender and/or recipient. These messages enable message distribution lists to be optimized very easily. In further preferred embodiments, the identifier and/or the relevant subidentifier indicates the date and time of creation of the original message where these differ from the time of transmission, and/or an e-mail address of an original sender if this differs from the e-mail address of the sender, and/or the contents of the message or of the respective message element.

The device aspect of the object is addressed by a data terminal that has a mail processing device which is designed such that an identifier for a message is evaluated in an evaluation unit based on data present concerning the entry of messages at an address data terminal from the past, and such that, based on the evaluation result, transmission of a message—or parts thereof—to an address data terminal is triggered or blocked.

The mail-processing device preferably forms part of a mail server, which is integrated in the data terminal. This multi-functionality of the data terminal ensures that the processing of messages generates as little data traffic is possible.

In a preferred embodiment, the data terminal is equipped with a memory unit for storing data concerning the entry of messages at a different data terminal. In this case the evaluation unit can decide quickly whether or not the transmission of the message or of parts thereof is to be triggered, since no information is required that is not already present on the data terminal.

The device aspect of this invention is further addressed by a network for data transmission that contains a mail processing device, which is designed such that an identifier for a message based on data present concerning the entry of messages at an address data terminal from the past is evaluated in an evaluation unit, and such that, based on the evaluation result, transmission of a message—or parts thereof—to the data terminal is riggered or blocked.

In a preferred embodiment the mail-processing device forms part of a mail server.

The data concerning the entry of messages in an address data terminal is preferably stored in the mail-processing device.

BRIEF DESCRIPTION OF THE DRAWINGS

The diagrams serve to explain the principle of the proposed method and to illustrate an exemplary embodiment. Of these.

DETAILED DESCRIPTION OF THE INVENTION

Figure 1:
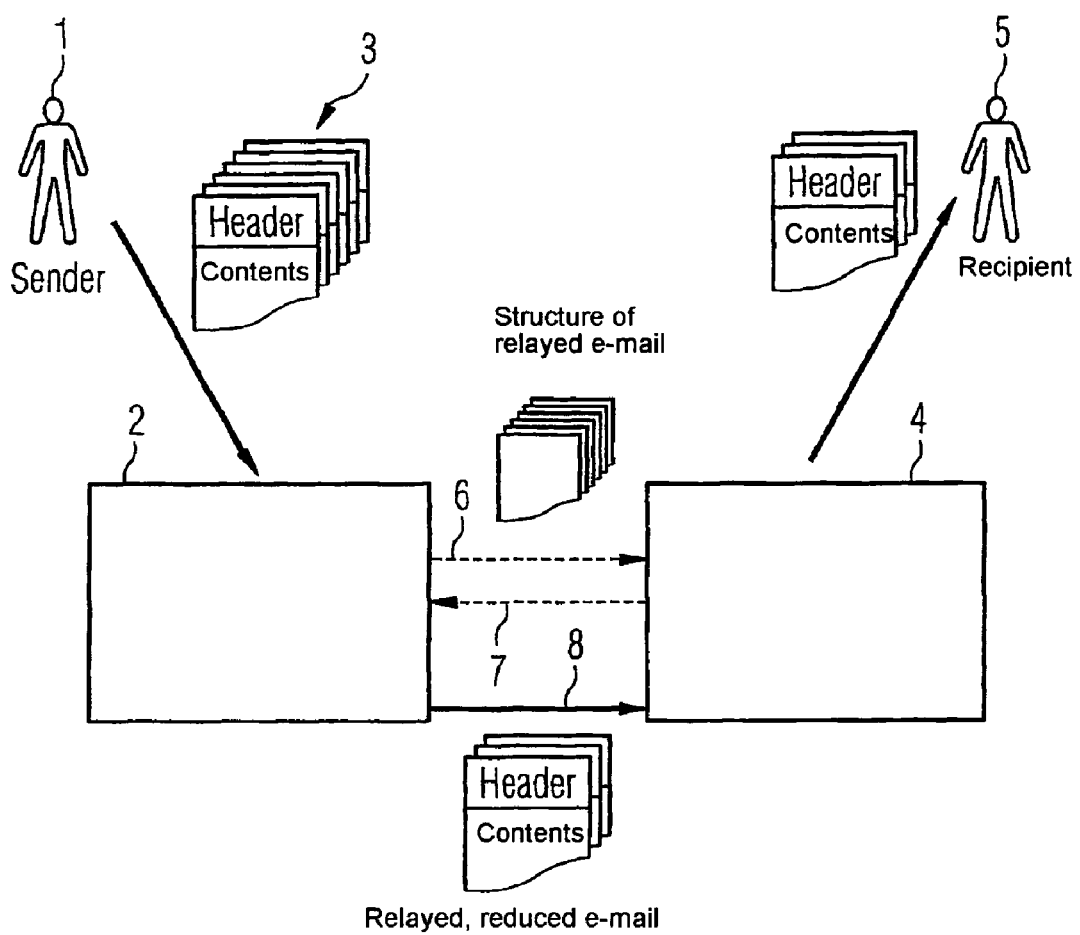
FIG. 1 is a schematic diagram showing the components involved in the method.

FIG. 1 schematically illustrates the components involved in the method for transmitting messages. These are as follows: a sender 1, a mail processing device 2 assigned to the sender 1, a message 3 which consists of message elements, i.e. a header and attachments, a mail processing device 4 assigned to the recipient, and a recipient 5 for the message.

The following data is assigned to the message 3: an identifier to indicate that it is a relayed message; date and time of transmission, and an e-mail address of the sender. Special additional information is assigned to each message element when the message 3 is forwarded. These are: date and time of creation of the original message, where these differ from the time of transmission, an e-mail address of the original sender, where this differs from the e-mail address of the sender 1, and the contents of the message element.

Figure 2:
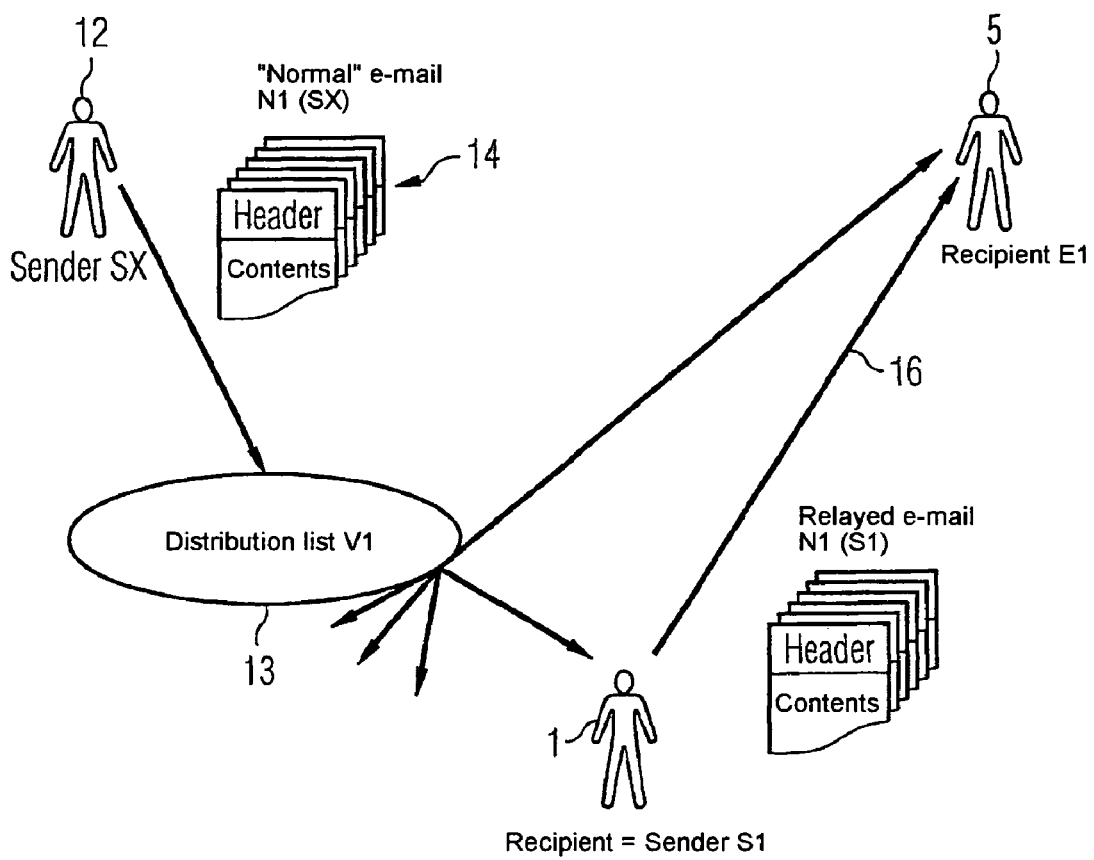
FIG. 2 is a schematic diagram showing the message relaying process.
Figure 3:
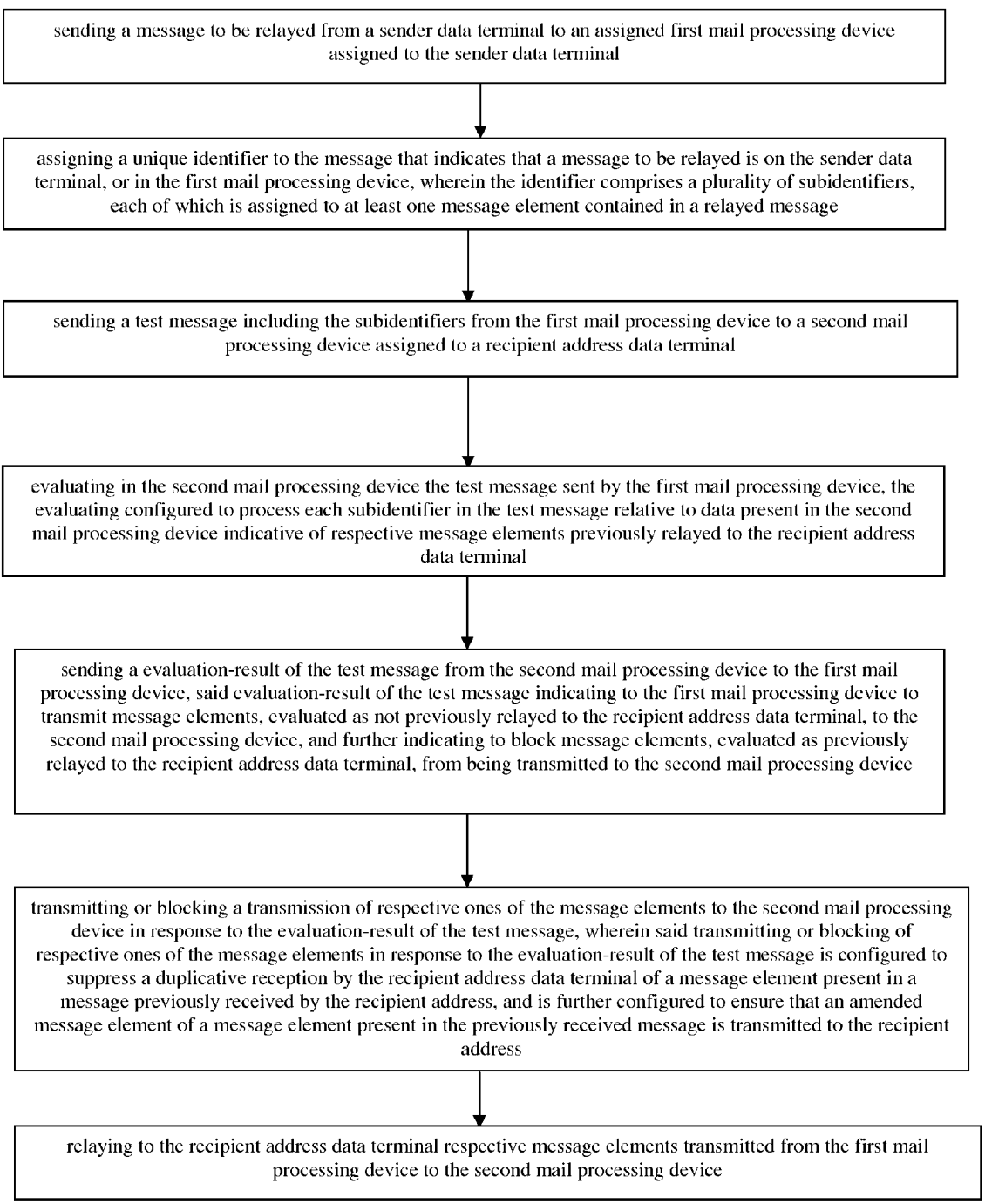
FIG. 3 is a flow chart illustrating a present preferred method of transmitting messages in a network.

The sequence of a message relaying process is described in greater detail below on the basis of FIGS. 1 and 2. The flow chart of FIG. 3 also illustrates a present preferred method, as may also be appreciated from the below description. The sender 1 has received, from a user designated as the sender 12, via a distribution list 13, a message 14 that has not been relayed or is identified as not having been relayed. The message 14 consists of a text and attachments, at which point it should be mentioned that both the text and the attachments do not necessarily have to be present. A message may even be blank in extreme cases.

The message 14 has the following structure: an identifier to indicate that it is a normal message; the date and time of transmission by the sender 12, the e-mail address of the sender 12; a message element NE 1.1, which shows the header; the content of NE 1.1; a message element NE 1.2, which shows the attachment; and the content of NE 1.2. Fields that are provided for date and time of creation of the original message and for the e-mail address of the original sender, are blank. At this point it should be mentioned that the last-mentioned fields do not necessarily have to form part of the message, but may be generated later or added to the message. In addition to the sender 1, a recipient 5 has also received the same message 14 via the distribution list 13. It would also be possible for the message 14 to be received directly from the sender 12 without it going via the distribution list 13.

The sender 1 wishes to relay the message 14 via a different distribution list (not shown) or directly to the recipient 15 (indicated by arrow 16), i.e. the recipient is on another distribution list or may also be addressed directly. For this purpose the message is forwarded to the mail-processing device 2 assigned to the sender (cf. FIG. 1). When the message 14 is sent, a decision is taken—by means of a user interface procedure or a presetting in the e-mail program which handles the sending of e-mails—that the e-mail is only to be forwarded to persons who have not yet received the message 14, in which case the contents of the message elements remain unchanged by the sender 11.

The mail processing device 2 assigned to the sender sends a test message to the mail processing device 4 assigned to the recipient, with the following content: an identifier to indicate that it is a relayed message; the date and time of transmission by the sender 11, the e-mail address of the sender 11; the message element NE 1.1, which shows the header, said header being provided, by the mail processing device 2 assigned to the sender, with an identifier that contains the date and time of transmission by the sender 12 and the e-mail address of the sender 12; and, from the message element NE 1.2 that shows the attachment, which is provided, by the mail processing device 2 assigned to the sender, with an identifier that contains the date and time of transmission by the sender 12 and the e-mail address of the sender 12. Contents of the message elements are not also sent.

Each mail processing device, i.e. both the mail processing device 2 assigned to the sender and the mail processing device 4 assigned to the recipient, stores information about received e-mails in the above-specified test message structure for its connected users. The length of time that this information is stored is freely configurable. The mail processing device 4 assigned to the recipient, which contains the test message (indicated by the arrow 6 in FIG. 1), evaluates whether it is a relayed message. If so, the mail-processing device 4 assigned to the recipient checks whether message elements with the same content have already been transmitted previously for the recipient 5. If so, the mail-processing device 4 assigned to the recipient forwards a message to the mail-processing device 2 assigned to the sender, stating that delivery is not necessary. If the message has not already been received by the recipient 5 in the past, or if elements of the message have not already been received by the recipient 5 in the past, then the identifiers for the message elements to be transmitted, that are identified as being new by the mail processing device 2 assigned to the recipient, are transmitted to the mail processing device 2 assigned to the sender. This is indicated by the arrow 7 in FIG. 1. The last-mentioned notification has the following content: a transmit request for the relayed message, an instruction not to send the content of the message element NE 1.1 that corresponds to the header, since this has been identified as being already present at the recipient 5, and an instruction to send the message element that corresponds to the attachment, since this has been identified as not being present at the recipient 5.

In the next stage (identified by the arrow 8 in FIG. 1), the requested contents of the message elements are sent to the mail-processing device 4 assigned to the recipient. (This is indicated by the arrow 8 in FIG. 1).

The message delivered to the recipient 5 has the following structure: an identifier that indicates that it is a relayed message; the date and time of transmission by the sender 1; the e-mail address of the sender 1; the message element NE 1.1, which shows the header with an identifier that contains the date and time of transmission by the sender 12 and the e-mail address of the sender 12; and the message element NE 1.2, which shows the attachment with an identifier that contains the date and time of transmission by the sender 12, the e-mail address of the sender 12 and the content of the attachment.

In cases where the contents of both the header and the attachment are already present at the recipient 5, an outline structure of the relayed message comprising the aforementioned components is transmitted, without the content of the attachment being sent. In this case the recipient 5 is notified of the attempted delivery and may take any action that may be necessary. The sender also receives a corresponding message for the same purpose.

It should be mentioned at this point that, even in cases where the message elements are identified by the sender 1 or by the mail processing device 2 assigned to the sender, the message itself is nevertheless sent as a normal message, which means that a test message is not generated, whilst the option to delete the message still remains for the receiver. Whilst this does not lessen the amount of data traffic in the network, it does however reduce the amount of processing by the recipient 5.

Messages are transmitted and received with the help of data terminals operated by the sender 1 and the recipient 5. These are not shown in greater detail in FIG. 1 and FIG. 2. The mail-processing device 2 assigned to the sender 1 is integrated in the data terminal of the sender, whilst the mail-processing device 4 assigned to the recipient 5 is integrated in the data terminal of the recipient. The two data terminals are interconnected via an appropriate network.

Although the invention is described on the basis of an exemplary embodiment with a defined combination of features, it nevertheless includes other possible advantageous combinations of these features as specified in particular, but not exhaustively, by the subclaims.

The invention claimed is:

1. A method for transmitting messages in a network via data terminals connected thereto, comprising:
    sending a message to be relayed from a sender data terminal to an assigned first mail processing device assigned to the sender data terminal;
    assigning a unique identifier to the message that indicates that a message to be relayed is on the sender data terminal, or in the first mail processing device, wherein the identifier comprises a plurality of subidentifiers, each of which is assigned to at least one message element contained in a relayed message;
    sending a test message including the subidentifiers from the first mail processing device to a second mail processing device assigned to a recipient address data terminal;
    evaluating in the second mail processing device the test message sent by the first mail processing device, the evaluating configured to process each subidentifier in the test message relative to data present in the second mail processing device indicative of respective message elements previously relayed to the recipient address data terminal;
    sending an evaluation-result of the test message from the second mail processing device to the first mail processing device, said evaluation-result of the test message indicating to the first mail processing device to transmit message elements, evaluated as not previously relayed to the recipient address data terminal, to the second mail processing device, and further indicating to block message elements, evaluated as previously relayed to the recipient address data terminal, from being transmitted to the second mail processing device;

transmitting or blocking a transmission of respective ones of the message elements to the second mail processing device in response to the evaluation-result of the test message, wherein said transmitting or blocking of respective ones of the message elements in response to the evaluation-result of the test message is configured to suppress a duplicative reception by the recipient address data terminal of a message element present in a message previously received by the recipient address data terminal, and is further configured to ensure that an amended message element of a message element present in the previously received message is transmitted to the recipient address data terminal, wherein a notification of the blocked transmission is forwarded to the sender data terminal and/or recipient address data terminal if the transmission is blocked on the basis of the evaluation results; and relaying to the recipient address data terminal respective message elements transmitted from the first mail processing device to the second mail processing device.

2. The method according to claim 1, wherein the identifier is evaluated on a mail server in the network.

3. The method according to claim 1, wherein the identifier and/or the relevant subidentifier indicates the date and time of creation of the original message where these differ from the time of transmission, and/or an e-mail address of an original sender if this differs from the e-mail address of the sender, and/or the contents of the message or of the respective message element.

4. The method according to claim 1, wherein there is a data terminal for executing the method and having a mail processing device that is designed such that an identifier for a message based on data present concerning the entry of messages at an address data terminal from the past is evaluated in an evaluation unit, and such that, based on the evaluation result, transmission of a message to the address data terminal is triggered or blocked.

5. The method according to claim 4, wherein the mail-processing device forms part of a mail server, which is integrated in the data terminal.

6. The method according to claim 4, wherein a memory unit for storing data concerning the entry of messages at a different data terminal.

7. A network, comprising:

a sending module configured to send a message to be relayed from a sender data terminal to a first mail processing device assigned to the sender data terminal;

an assigning module configured to assign a unique identifier to the message that indicates that a message to be relayed is on the sender data terminal, or in the first mail processing device, wherein the identifier comprising a plurality of subidentifiers, each of which is assigned to at least one message element contained in a relayed message;

a test message sensing module configured to send a test message including the subidentifiers from the first mail processing device to a second mail processing device assigned to a recipient address data terminal;

an evaluator configured to evaluate in the second mail processing device the test message sent by the first mail processing device, the evaluating configured to process each subidentifier in the test message relative to data present in the second mail processing device indicative of respective message elements previously relayed to the recipient address data terminal;

a sending module configured to send an evaluation-result of the test message from the second mail processing device to the first mail processing device, said evaluation-result of the test message indicating to the first mail processing device to transmit message elements, evaluated as not previously relayed to the recipient address data terminal, to the second mail processing device, and further indicating to block message elements, evaluated as previously relayed to the recipient address data terminal, from being transmitted to the second mail processing device;

a module configured to transmit or to block a transmission of respective ones of the message elements to the second mail processing device in response to the evaluation-result message, wherein the transmission or block of respective ones of the message elements in response to the evaluation-result of the test message is configured to suppress a duplicative reception by the recipient address data terminal of a message element present in a message previously received by the recipient address data terminal, and is further configured to ensure that an amended message element of the message element present in said previously received message is transmitted to the recipient address data terminal, wherein a notification of the blocked transmission is forwarded to the sender data terminal and/or recipient address data terminal if the transmission is blocked on the basis of the evaluation results; and a module configured to relay to the recipient address data terminal respective message elements transmitted from the first mail processing device to the second mail processing device.

8. The network according to claim 7, wherein the mail-processing device forms part of a mail server.

9. The network according to claim 8, further comprising a memory unit for storing previously relayed message elements.

* * * * *